United States Patent [19]

Hobbs

[11] Patent Number: 4,654,953
[45] Date of Patent: Apr. 7, 1987

[54] TOOL QUILL EXCHANGING MECHANISM FOR A MACHINE TOOL

[75] Inventor: Robert N. Hobbs, Springfield, Vt.

[73] Assignee: Ex-Cell-O Corporation, Troy, Mich.

[21] Appl. No.: 646,992

[22] Filed: Sep. 4, 1984

[51] Int. Cl.$^4$ ............................................. B23Q 3/157
[52] U.S. Cl. ........................................ 29/568; 51/168
[58] Field of Search ................ 29/568, 26 A; 51/168

[56] References Cited

U.S. PATENT DOCUMENTS

| | | | |
|---|---|---|---|
| 3,524,248 | 8/1970 | Durr et al. | 29/568 |
| 3,789,472 | 2/1974 | Pegard | 29/568 |
| 4,535,527 | 8/1985 | Fisher et al. | 29/568 |

Primary Examiner—Z. R. Bilinsky
Attorney, Agent, or Firm—Edward J. Timmer

[57] ABSTRACT

A machine tool, such as an internal grinding machine, includes a tool quill exchanging mechanism having an indexable tool quill storage magazine for positioning a replacement tool quill at a pick-up position, a worn or used tool quill discharge mechanism having a tool quill pick-off cam plate and discharge chute in spaced juxtaposition to the tool quill pick-up position. A pivotal tool quill exchange arm includes first and second tool quill stations for releasably retaining a worn or used tool quill and replacement tool quill, respectively, and is pivotal to first and second tool quill exchange positions. At the first tool quill exchange position relative to the tool quill storage magazine and discharge means, a worn or used tool quill is removed from the first tool quill station by the pick-off means and falls into a discharge chute and generally concurrently the second tool quill station removes a new tool quill from the pick-up position and releasably grips same. At the second tool quill exchanger position relative to the toolhead of the machine, the tool quill exchange arm and toolhead are moved relative to one another to align the vacant first tool quill station and replacement tool quill in the second tool quill station of the tool exchange arm with the spindle to remove a worn or used tool quill therefrom and insert a replacement tool quill therein.

13 Claims, 12 Drawing Figures

TOOL QUILL EXCHANGING MECHANISM FOR A MACHINE TOOL

FIELD OF THE INVENTION

The present invention relates to a tool quill exchanging mechanism for a machine tool, especially a grinding machine.

BACKGROUND OF THE INVENTION

A single workhead internal grinding machine with a wheel head mounted on a compound slide assembly is described in U.S. Pat. No. 4,419,612 issued Dec. 6, 1983 to Kazimierz J. Reda et al. An electro-mechanical control system for controlling all of the movements of the compound slide system is provided and utilizes a control computer interfaced with servo-drive means which in turn control slide electric drive motors.

In use, the grinding wheel carried on the wheelhead of such a grinding machine eventually wears to the point where it must be replaced. The grinding wheel is typically fixedly mounted on a shaft or quill which is chucked in the wheelhead spindle. In the past, replacement of a quill with a worn wheel involved shutting down the grinding machine and manually replacing a worn wheel with a new one. Of course, the time and labor required for grinding wheel quill replacement was lost production time and added labor cost to machine a particular part.

SUMMARY OF THE INVENTION

The invention has as an object to provide a tool quill exchanging mechanism for such a grinding machine as well as other machine tools capable of exchanging one tool quill for another tool quill relative to a toolhead spindle in a fast, automatic manner.

The invention contemplates a machine tool, such as a grinding machine, having tool quill storage means for storing a plurality of tool quills, means for positioning a replacement tool quill of the storage means at a quill pick-up position, and a tool quill discharge means having a tool quill pick-off means in spaced juxtaposition to the tool quill pick-up position. Preferably, the tool quill storage means and tool quill positioning means comprise an indexable tool quill magazine containing a plurality of replacement tool quills. A pivotal tool quill exchange arm includes a first tool quill station for releasably retaining a tool quill removed from the spindle and a second tool quill station for releasably retaining a replacement tool quill in spaced juxtaposition to the removed tool quill such that when the tool quill exchange arm is pivoted to a first tool quill exchange position relative to the tool quill storage means and discharge means the tool quill pick-off means removes the tool quill from the first tool quill station of the exchange arm and generally concurrently the second tool quill station picks up a replacement tool quill from the pick-up position, for example from the tool quill magazine indexed to position a replacement tool quill for pick-up.

The tool quill exchange arm is also pivotable to a second tool quill exchange position relative to the toolhead of the machine tool where the vacant first tool quill station and replacement tool quill in the second tool quill station are successively aligned relative to the toolhead spindle by relative movement between the tool quill exchange arm and toolhead to remove a tool quill from the spindle to the first tool quill station and to insert a replacement tool quill therein from the second tool quill station. Means associated with the toolhead spindle is operable to permit release of a tool quill chucked therein to the first tool quill station and to releasably grip a replacement tool quill inserted from the second tool quill station.

In a preferred embodiment of the invention, the tool quill exchange mechanism includes a frame fixedly mounted on the machine bed straddling the toolhead. The tool quill exchange arm is pivotally mounted on the frame and is pivoted between the first and second tool quill exchange positions by a servo motor through a drive arrangement. At the second tool quill exchange position, longitudinal and cross slides constituting a compound slide assembly move the toolhead relative to the first and second tool quill stations of the tool quill exchange arm to effect removal of a tool quill from the spindle and insertion of a replacement tool quill in the spindle.

In another preferred embodiment of the invention, the tool quill exchange arm includes a tool quill transfer member including the first and second tool quill stations wherein the first tool quill station comprises a U-shaped pocket in the transfer member to receive the shank of a tool quill and a spring-biased pin to releasably engage and retain the tool quill in the pocket. The second tool quill station for a replacement tool quill includes a U-shaped pocket in the transfer member and a fluid operated clamp pin to releasably engage and retain the shank of the replacement tool quill.

In still another preferred embodiment of the invention, the tool quill discharge means includes a cam or strike plate constituting tool quill pick-off means against which the shank of a tool quill is cammed during final pivotal motion of the tool quill exchange arm to the first tool quill exchange position to dislodge the tool quill from the first tool quill station. The dislodged tool quill falls into a stationary discharge chute positioned to catch the tool quill and preferably carry the tool quill away from the first tool quill exchange position.

A novel grinding wheel quill is also disclosed.

These and other features, objects and advantages of the invention will become apparent in detail from the following drawings and detailed description.

DESCRIPTION OF PREFERRED EMBODIMENTS

Figure 1:
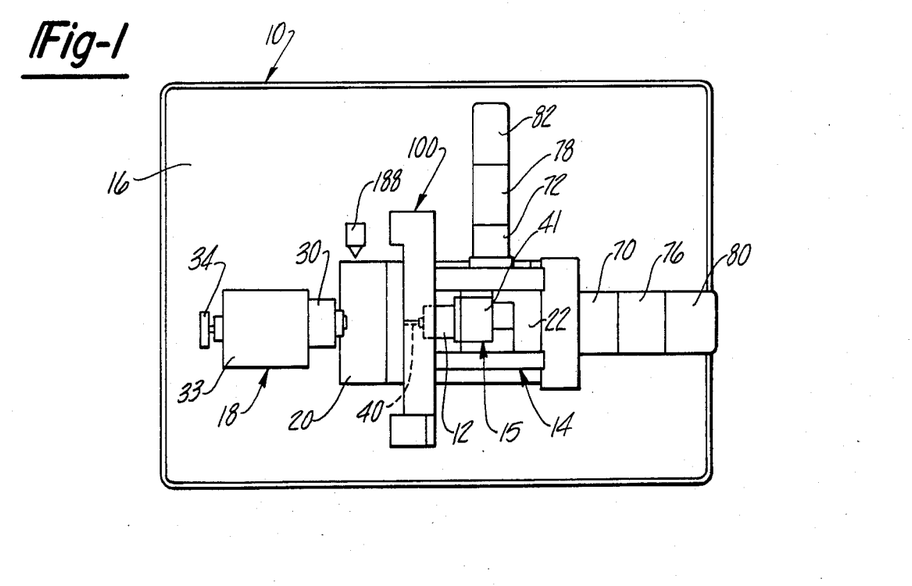
FIG. 1 is a schematic illustration of a grinding machine including the tool quill exchanging mechanism of the invention.

Referring to FIG. 1, the numeral 10 generally designates a one-station electro-mechanical internal grinding machine with a single grinding wheel spindle 12 on a compound slide assembly 14. Spindle 12 is rotatably mounted in wheelhead 15 as described hereinbelow.

The grinding machine 10 includes a conventional bed or base member 16 on which is operatively mounted a conventional workhead 18. The compound slide assembly 14 is also mounted on the base member 16 and includes a longitudinal or Z-axis slide 20 mounted on base 16 and a cross or X-axis slide 22 operatively mounted on Z-axis slide 20. The wheelhead can be moved simultaneously in the Z-axis and X-axis directions by slides 20 and 22 as is well known.

The workhead 18 may be of any suitable conventional structure and includes a chucking fixture 30 for holding a workpiece. The chucking fixture 30 may be of the centerless type and rotated by a motor 33 and pulley 34 on the workhead 18.

As shown in FIG. 1, a grinding wheel quill 40 is operatively held in the spindle 12 which is rotated by motor 41. By movement of the Z-axis and X-axis slides 20 and 22, the grinding wheel 41 on quill 40 can be moved to and from the workpiece held in chucking fixture 30 and into contact with the workpiece; e.g., into contact with an inner bore, to grind same as is known.

Figure 11:
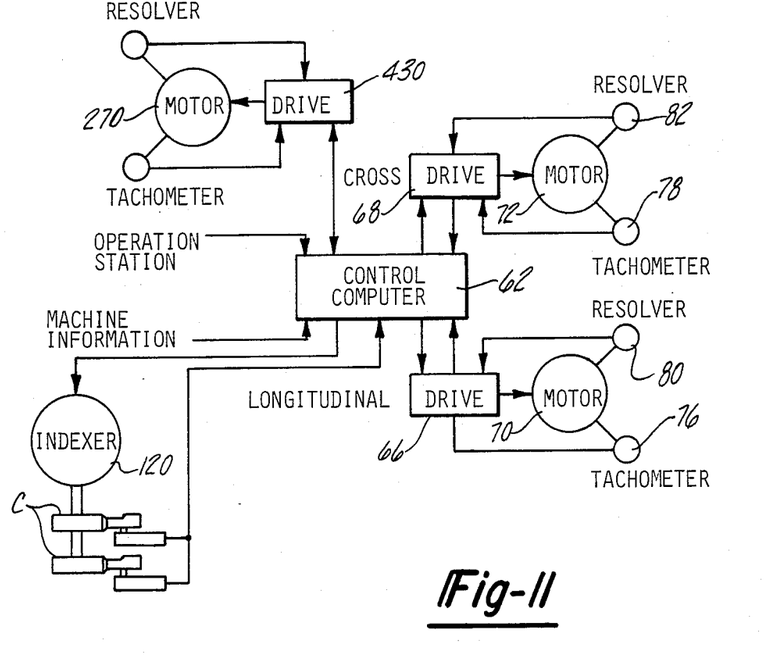
FIG. 11 is a block diagram of an illustrative control system for use with the invention.

FIG. 11 is a block diagram of the control system employed to control movements of the Z-axis and X-axis slides 20 and 22 on which the wheelhead 15 is carried. The numeral 62 generally designates a control computer which is programmed to control all machine functions and interlocks. Such functions include lubrication status, safety interlocks, motor status and operation control station information. The control computer 62 may be any suitable digital computer or microprocessor. The control computer 62 has stored the positions and rates for all the axis moves for the various sequences which may include a grind cycle, dress cycle and so forth. The control computer 62 sends servo drive signals to the servo drive means 66 and 68 for controlling the servo motors 70,72 with respect to the respective Z-axis and X-axis slides to cause the grinding wheel to move in the desired wheel contour path. The servo drive means 66,68 take feedback from the tachometers 76,78, respectively. The numerals 80,82 designate either resolvers, encoders or "INDUCTOSYN" transducers and they provide feedback signals to the drive means 66,68, respectively, in closed servo loop manner with the tachometers.

A suitable control computer 62 is available on the market from Intel Corp. of Santa Clara, Calif. 95054 and sold under the name of "INTEL" (a trademark) 86/05 Single Board Computer. The servo drive means 66,68 may be any suitable servo drive means as, for example, a servo drive available on the market from Hyper Loop, Inc. of 7459 W. 79 Street, Bridgeview, Ill. 60455 under the trademark "HYAMP". The HYAMP servo drive is a single phase, full wave, bi-directional SCR servo drive for D.C. motors and it provides D.C. drive power for precise speed control and regulation over a wide speed range. Another suitable servo drive designated as Size 50 is available from General Electric Co., 685 West Rio Road, Charlottsville, Va. 22906.

The servo motors 70,72 may be any suitable D.C. servo motor. Suitable D.C. servo motors of this type are available from Torque Systems Inc., 225 Crescent Street, Waltham, Mass. 02154 under the trademark "SNAPPER" and identified as frame sizes 3435 and 5115. A larger motor of this type is also available from the H. K. Porter Co., 301 Porter Street, Pittsburgh, Pa. 15219.

The tachometers 76,78 are part of the D.C. servo motors. The resolvers, encoders or INDUCTOSYN transducer 80,82 are commercially available items and may be any suitable conventional position feedback devices available on the market. Resolvers of this type are available from the Clifton Precision Company of Clifton Heights, Pa. 19018. INDUCTOSYN precision linear and rotary position transducers are available from Ferrand Controls, a division of Farrand Industries, Ind., 99 Wall Street, Valhalla, N.Y. 10595. A suitable optical shaft angle encoder designated as Model No. DRC-35 is available from Dynamics Research Corp., 60 Concord Street, Wilmington, Mass 01887.

The Z-axis and X-axis slides 20,22 are driven and controlled by the control system described above by a conventional ball screw (not shown), Acme screw or other screw means rotated by servo motors 70,72 as explained in U.S. Pat. No. 4,419,612 issued Dec. 6, 1983 of common assignee, the teachings of which are incorporated herein by reference.

The operation of such a grinding machine 10 in the grinding mode under control of a control computer is described in detail in the aforementioned U.S. Pat. No. 4,419,612 incorporated herein by reference hereinabove.

Figure 4:
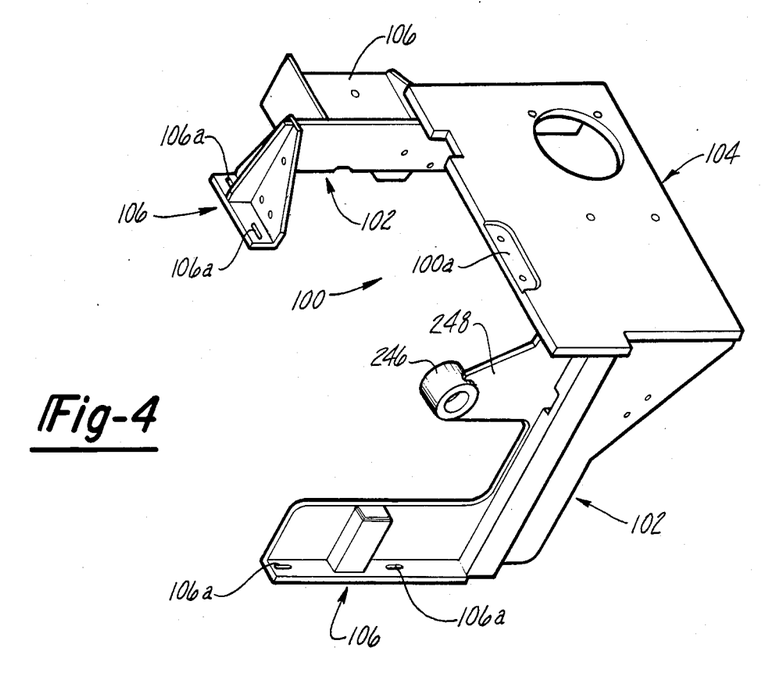
FIG. 4 is a perspective view of the frame of the tool quill exchanging mechanism.

The grinding wheel exchanging mechanism of the invention is carried on a generally inverted U-shaped support frame 100 having spaced apart vertical legs 102, platform 104 attached on the legs and attachment rails 106, FIG. 4. Rails 106 are bolted fixedly to the stationary machine bed 16 through slots 106a in the rails using bolts 108. When bolted to the machine bed, the support frame 100 is stationary relative to the wheelhead 15 and straddles the wheelhead as best seen in FIG. 1.

Mounted on the platform 104 of the support frame is a rotary indexer 120 having motor 120a commercially available under the trademark FERGUSON INDEXER from Ferguson Machine Company located at 11820 Lackland Road, St. Louis, Mo. 63141. The rotary indexer is fastened to platform 104 by machine screws 122 and includes an output shaft 124 which is fixedly attached to a horizontal circular tool quill magazine disc 126 so that the disc can be indexed in increments for purposes to be described. The rotary indexer is under the control of computer 62. The tool quill magazine disc 126 includes apertures 128 for weight reduction purposes and a plurality of quill holders 130 spaced around the circumference of the disc. The quill holders 130 include flanges 132 which are attached to the disc circumference by machine screws 134 or other known fastening means. As shown best in FIGS. 7 and 8, each quill holder includes a body 140 having a vertical pocket 142 open at the disc circumference and adapted to releasably receive the end shank 150 of quill 152. Each quill further includes an annular flange or shoulder 154, grinding wheel 156 and an intermediate cylindrical shank 158 for purposes to be described herebelow. The grinding wheel 156 is screwed by machine screw 157 or otherwise securely attached to the quill. It is apparent from FIG. 8 that end shank 150 of each quill is received in the vertical pocket 142 of each quill holder body. Each quill holder 130 also includes a spring loaded pin 160 projecting into each pocket 142 to engage the end shank 150 of each quill to releasably hold the quill in each open pocket.

A tool quill magazine cover 162 is provided around the tool quill magazine disc 126 to keep dirt and foreign debris from the grinding wheel quills stored therein. The tool quill magazine disc in one embodiment can circumferentially store 32 new or replacement grinding wheel quills, i.e., quills having grinding wheels which have not yet been used and which are inserted individually into the wheelhead spindle when the grinding wheel of the quill chucked therein is worn beyond limits as will be explained further hereinbelow.

The tool quill magazine cover 162 includes a front trap door 164 and rear access door 166. Rear access door is hinged at 168 to allow the door to be swung open (upwardly in FIG. 2) to insert new grinding wheel quills in vacant pockets 142 on the magazine disc 126. The front trap door 164 is openable and closeable by air cylinder 170 having connecting rod 172 and clevis coupling 174 connected to the piston 176 of the cylinder. The cylinder 170 itself is supported on a support bracket 180 having a horizontal bracket 182 and vertical bracket 184, the latter being fastened as by machine screws 186 to the stationary dresser support plate 188 (shown in phantom) or other fixed support of the machine bed 16. As will be appreciated, the trap door 164 is openable to expose a new grinding wheel quill which has been indexed to a pick-up position $P_1$ shown in FIGS. 2 and 7 to allow entry and access of the quill transfer member 198 of the pivotal tool quill exchange arm 200 to the exposed quill at that position. Of course, the tool quill magazine cover 162 is open on the bottom in the vicinity of quill pick-up position $P_1$ to permit pivoting of the quill exchange arm 200 to the pick-up position $P_1$.

Figure 2:
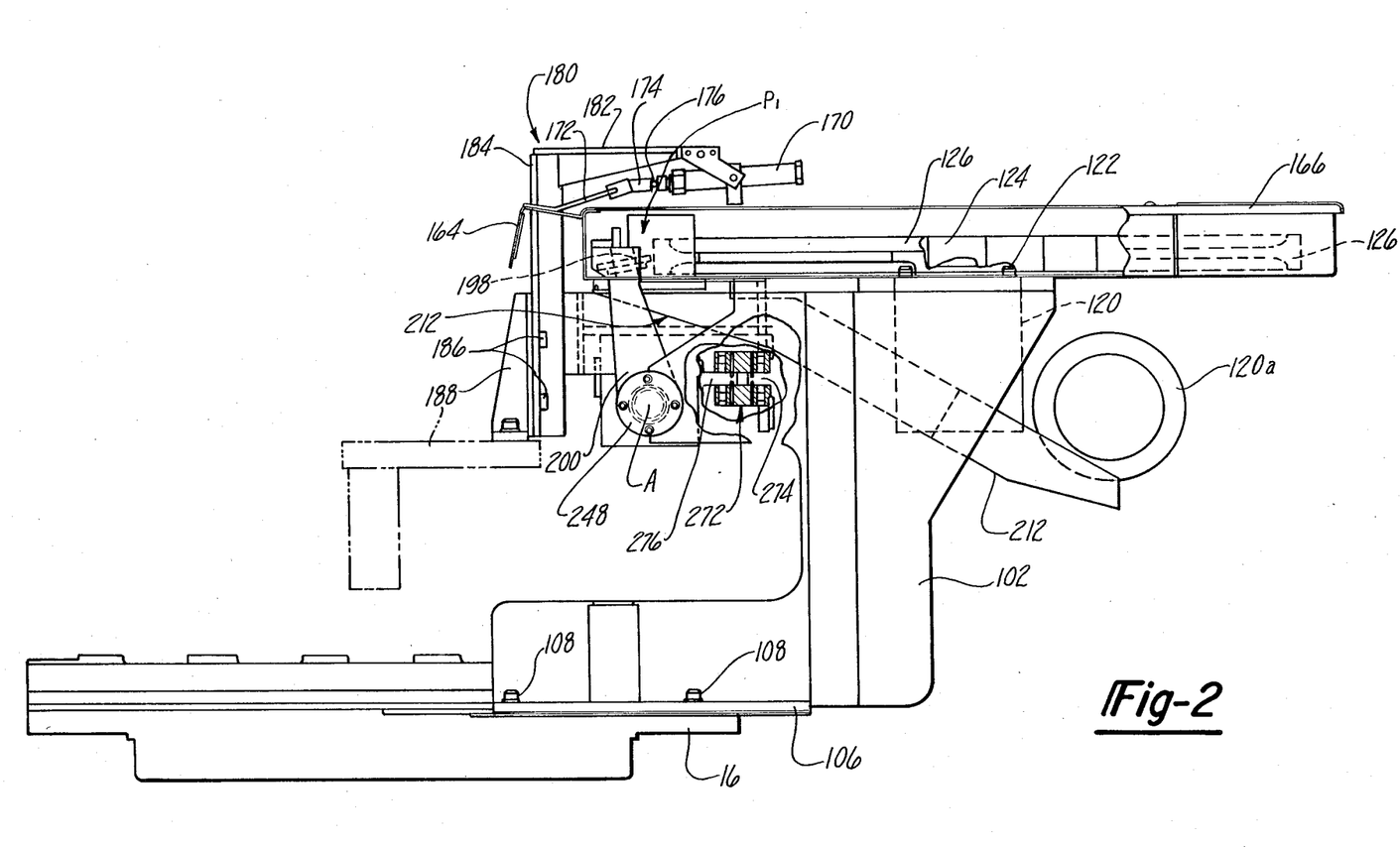
FIG. 2 is a side elevation of the tool quill exchanging mechanism and a portion of the machine bed in the direction of arrow 2 in FIG. 1.
Figures 6, 10:
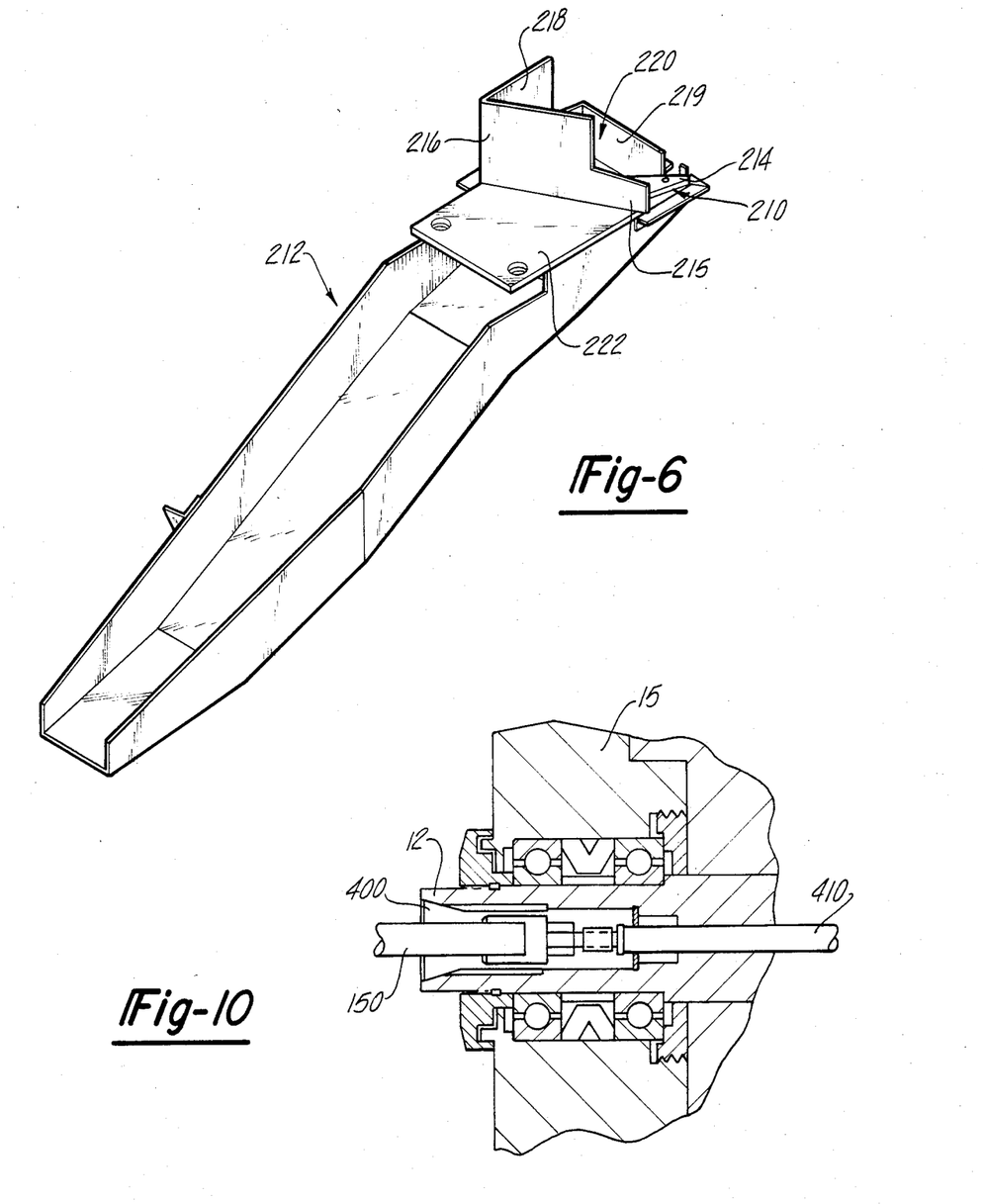
FIG. 6 is a perspective view of the worn tool quill discharge strike plate and chute.
FIG. 10 is a partial longitudinal sectional view of the wheelhead spindle showing the collet to grip the tool quill shank.
Figure 7:
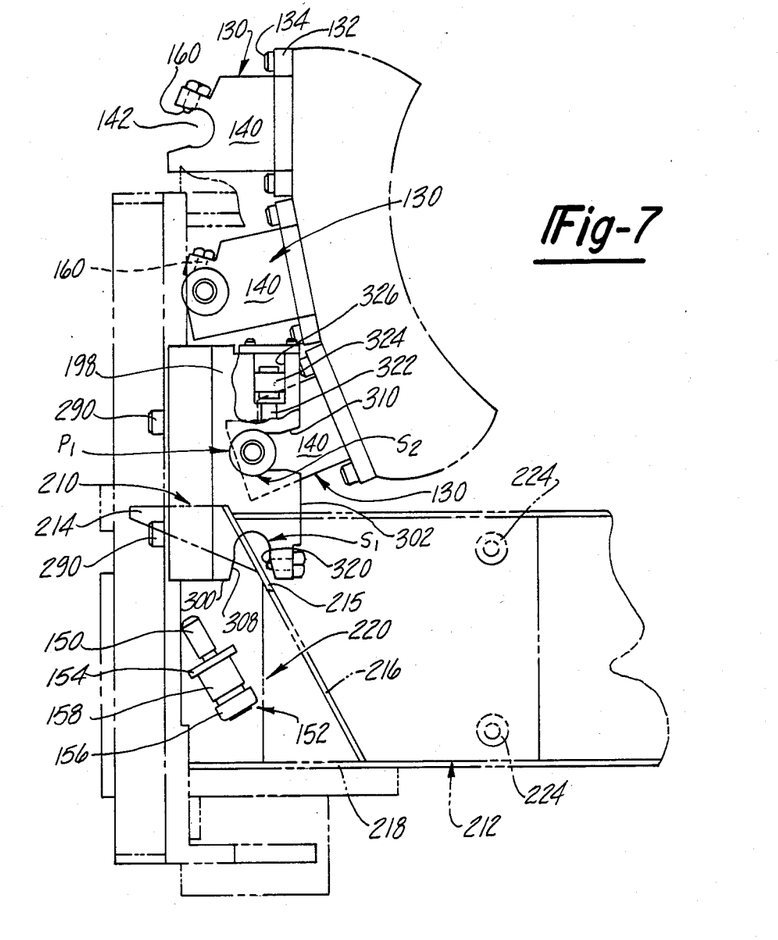
FIG. 7 is a partial plan view of the indexable tool quill magazine and tool quill transfer member of the tool quill exchange arm at the first tool quill exchange position.

Mounted in spaced juxtaposition to the quill pick-up position $P_1$ is a quill discharge means comprising a cam or strike plate 210 fastened to a quill discharge chute 212 as best shown in FIGS. 2, 6 and 7. As will be explained herebelow, a quill with a worn grinding wheel will be cammed out or dislodged from the transfer member 198 of quill exchange arm 200 during pivoting motion of the arm to pick-up position $P_1$. To this end, cam plate 210 slopes gradually upward in FIGS. 6 and 7 and triangular shaped cam surface 214 thereof engages the bottom of end shank 150 of the grinding wheel quill to cam the quill from the transfer member 198. Vertical walls 215, 216, 218 and 219 on the discharge chute 212 form a quill collection or receiving chamber 220 into which a dislodged quill falls and then is carried by gravity along the length of chute 212 to a bin (not shown) or other collection area so that a new grinding wheel can be substituted for a worn wheel thereon. The discharge chute 212 includes a rearwardly extending flange 222 which is fastened to lip 100a of the support frame 100 by machine screws 224.

It is apparent from FIG. 7 that the quill pick-up position $P_1$ is in generally spaced juxtaposition to the discharge chute 212 and cam plate 210 for cooperation with the quill transfer member 198 of the quill exchange arm 200 in a manner to be explained herebelow.

Figure 3:
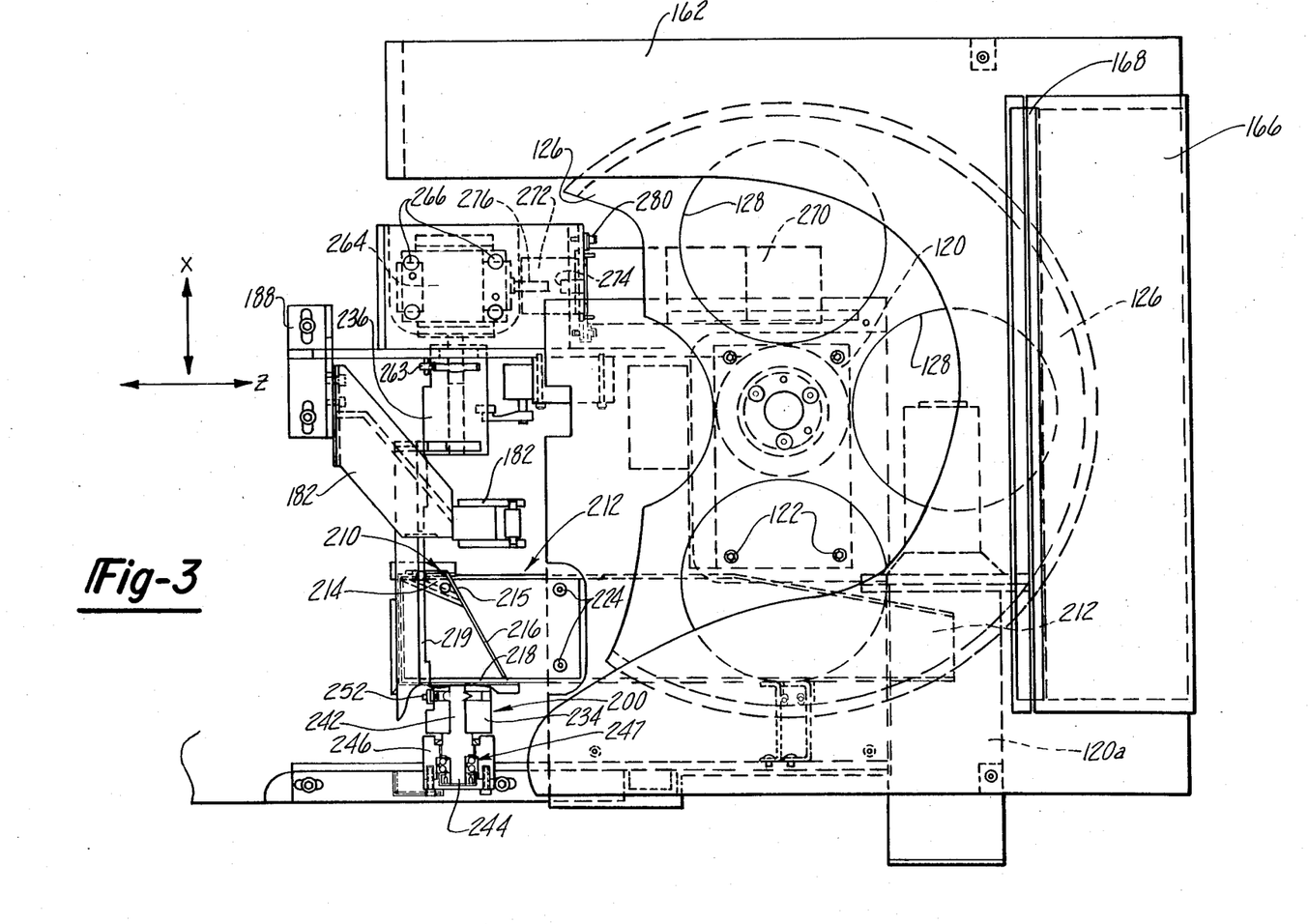
FIG. 3 is a plan view of the tool quill exchanging mechanism of FIG. 2.
Figure 5:
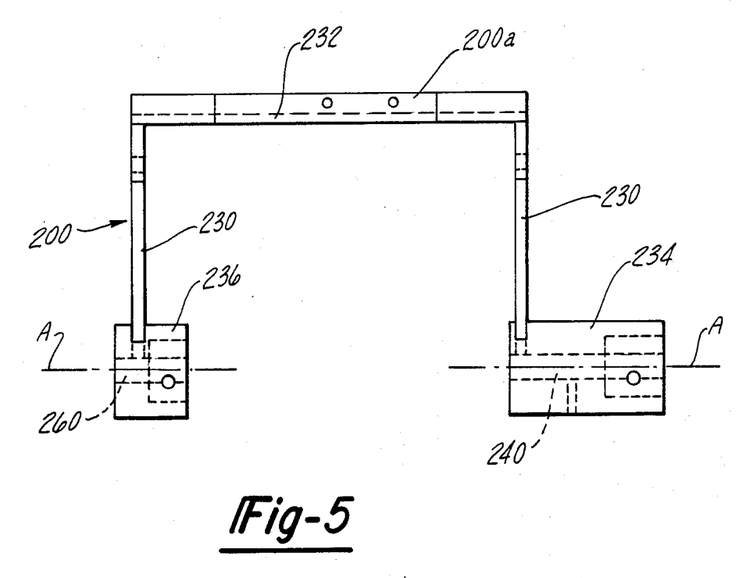
FIG. 5 is a front elevation of the tool quill exchange arm.

The pivotal quill exchange arm 200 is shown in detail in FIG. 5. The exchange arm is inverted U-shaped with spaced parallel legs 230 and cross-plate 232. The legs 230 terminate in cylindrical tubular extensions 234,236 which are coaxial with one another. As shown best in FIGS. 3 and 5, tubular extension 234 includes a central bore 240 which receives a shaft 242 from load arm 244 which is rotatably mounted by a pair of conventional ball bearings 247 in hollow housing 246. Housing 246 is rigidly attached to forwardly projecting arm 248 on the support frame. The load arm shaft 242 is pinned in position inside the arm extension 234 by locking pin 252.

Tubular extension 236 of the quill exchange arm 200 includes a central bore 260 which receives the output shaft 262 of a conventional gear reducer 264 which is fastened to and below a support flange 100b on the support frame 100 by multiple machine screws 266. Shaft 262 is pinned by pin 263 to extension 236. The gear reducer in turn is drivingly coupled to a D.C. servomotor 270 by means of a flexible coupling 272; i.e., output shaft 274 of the servomotor is received and pinned in position in one end of the coupling 272 and the input shaft 276 of the gear reducer likewise is received and pinned in the other opposite end of the coupling. As shown, the D.C. servomotor 270 is fixedly attached to the support flange 100b by machine screws 280.

By means of this arrangement, the quill exchange arm 200 is pivoted or rotated about an axis A defined by the output shaft 262 of the gear reducer and coaxially aligned load arm shaft 242.

Figure 8:
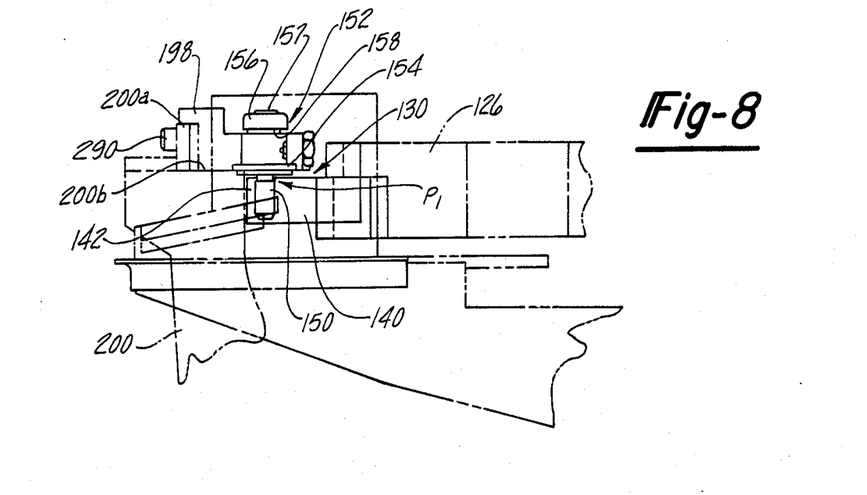
FIG. 8 is a side elevation of the tool quill magazine and tool quill transfer member of FIG. 7 taken in the direction of arrow 7.

Referring to FIGS. 7 and 8, it is apparent that the quill transfer member 198 is attached to an upstanding rib 200a on the end of the pivotal quill exchange arm 200 by machine screws 290 and rests on shoulder 200b of the arm. The transfer member 198 includes a first quill station $S_1$ in a side 300 of the transfer member and a second quill station $S_2$ in another side 302 intersecting at a 90° angle to side 300. The first and second quill stations include a generally U-shaped slot 308,310 in the sides 300,302, respectively, extending through the vertical thickness of the transfer member. As seen in FIGS. 7 and 8, the width of the pockets or slots 308,310 is selected to receive the intermediate shank 158 of the quill. Each slot 308,310 is open to the respective side 300,302 of the transfer member to allow a quill to enter therein.

The first quill station $S_1$ includes a spring-biased pin 320 extending into the pocket 308 to releasably engage the intermediate quill shank 158 and releasably retain the quill in the pocket. The second quill station $S_2$ includes a fluid pressure biased clamp pin 322 extending into the pocket 310 to releasably engage the intermediate quill shank also. The clamp pin 322 is connected to piston 324 slidably received in bore 326 in the transfer member 198. Air pressure is supplied to the opposite sides of the piston to cause same to slide into the pocket 310 into engagement with the intermediate quill shank or away from the pocket to release the intermediate quill shank.

As is apparent from FIGS. 7 and 8 which show the quill exchange arm 200 at a first tool exchange position $E_1$, first and second quill stations $S_1$ and $S_2$ of the transfer member are in spaced apart juxtaposition with second station $S_2$ aligned substantially vertically and coaxially above pick-up position $P_1$ and with first station $S_1$ aligned generally above the intersection of upwardly sloping cam surface 210 and wall 214. In particular, the radial center of pocket 310 is aligned substantially vertically and coaxially above the radial center of the tool holder pocket 142 at pick-up position $P_1$.

Figure 9:
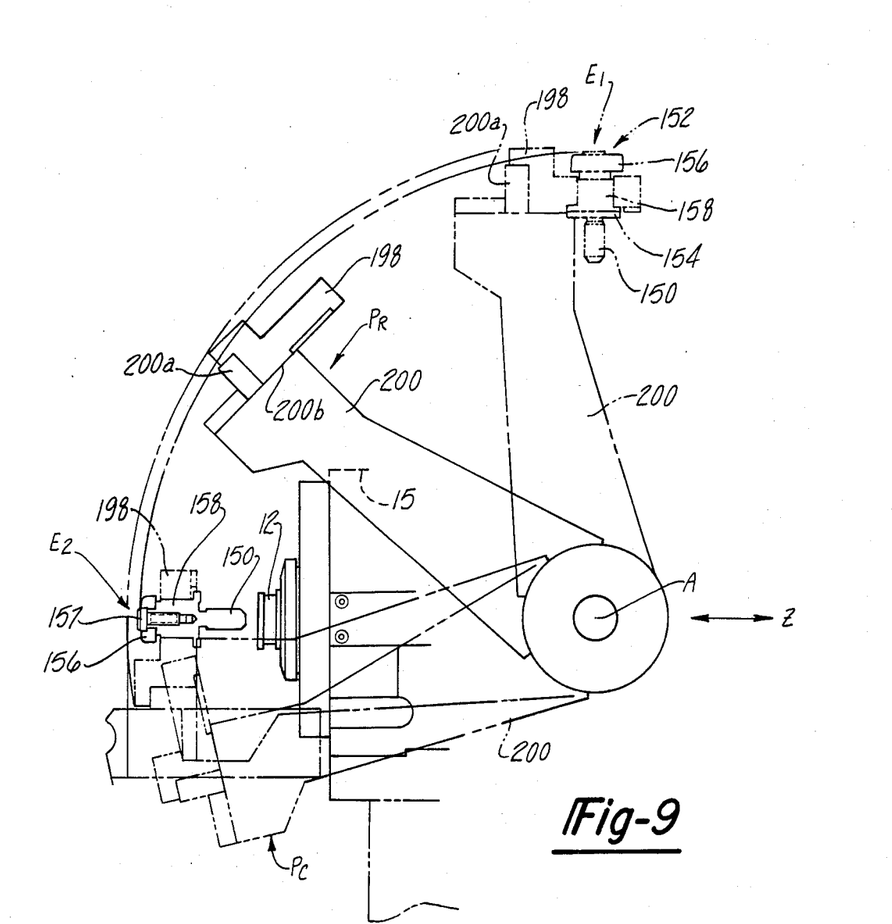
FIG. 9 is a partial side elevation of the tool quill exchange arm and wheelhead showing the operating positions of the former, including the operating position at the second tool quill exchange position.

Also, as shown in FIG. 9, at first tool exchange position $E_1$ the longitudinal axis Q of the grinding wheel quill 152 extends through the center of the pivot axis A of the quill exchange arm 200 when the arm places the second quill station $S_2$ coaxially above the pick-up position $P_1$ established by the quill magazine disc 126.

FIG. 7 illustrates the quill transfer member 198 and quill exchange arm 200 in the first tool quill exchange position $E_1$ with the first and second quill stations $S_1$, $S_2$ aligned as described hereinabove with respect to the pick-up position $P_1$ and quill discharge cam plate 210 and chute 212.

FIG. 9 illustrates the various pivotal positions of the quill exchange arm 200 in a typical sequence for exchanging a grinding wheel quill 152. During the grinding cycle, the quill exchange arm 200 is in a so-called rest position $P_R$ shown in the Figures (45° from horizontal) and the arm carries a quill with a worn wheel in quill station $S_1$ previously removed from the spindle 12 of the wheelhead 15 at a second quill exchange position as will be described. When a worn wheel signal on the grinding cycle just ended is generated by suitable known wheel size sensing means indicating the wheel currently in the spindle is worn beyond limits, the front trap door 164 of the quill magazine cover is opened by cylinder 170 in response to opening of a suitable solenoid valve (not shown) itself actuated through central computer 62, FIG. 11, in response to the worn wheel signal. The quill exchange arm 200 pivots from the rest position $P_R$ clockwise to the first quill exchange position $E_1$ relative to quill pick-up position $P_1$ and discharge cam plate 210 and chute 212. Just before reaching the 12 o'clock position shown in FIG. 9 during final pivotal motion of the quill exchange 200, the quill carried in quill station $S_1$ of the arm is mechanically cammed out or dislodged from the quill transfer member 198 and falls into chute 212. At the 12 o'clock position shown in FIGS. 7 and 9, a replacement quill at pick-up position $P_1$ on the tool quill magazine enters pocket 310 of quill station $S_2$ of the quill transfer member 198. Then, clamp pin 322 is actuated by piston 324 to extend into pocket 310 and releasably engage and retain the replacement quill therein as described hereinabove.

The quill exchange arm with the quill discharged from station $S_1$ and the replacement quill releasably retained in station $S_2$ is rotated counterclockwise to the horizontal position shown in FIG. 9 constituting a second quill exchange position $E_2$ relative to the wheelhead 15. Trap door 104 of the quill magazine closes when the arm reaches second quill exchange position $E_2$. At this position, the Z-axis and X-axis slides 20,22 are moved to position the intermediate quill shank 158 of the worn quill chucked in the spindle 12 in the pocket 308 of quill station $S_1$ on the transfer member 198. As the intermediate quill shank 158 enters the pocket 308, it is releasably clamped by spring-loaded pin 320 of station $S_1$. Once the worn quill is clamped in station $S_1$, the collet 400 in the spindle 12 of wheelhead is released by a known drawbar mechanism 410, i.e., the drawbar mechanism pushes the collet 400 to the left in FIG. 10 to release the end shank 150 of the quill 142 therein. The Z-axis slide 20 is then moved to the right in FIG. 9 while the quill with the worn wheel remains releasably retained in quill station $S_1$ of the quill transfer member 198. The quill with the worn wheel is thus removed from the spindle 12.

Figure 12:
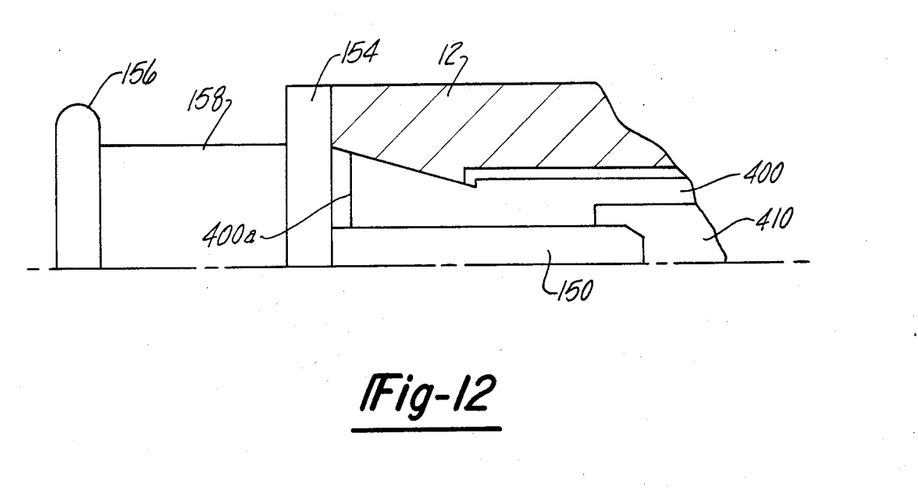
FIG. 12 is a partial sectional view of the wheel quill in sealing abutment with the spindle.

Loading or insertion of the replacement quill releasably retained in station $S_2$ is effected by moving the X-axis slide 22 to align the spindle/collet axis substantially coaxial with the quill axis in station $S_2$. The Z-axis slide 20 is moved to the left in FIG. 9 to cause the end shank 150 of the replacement quill to enter the spindle 12 and collet 400 and annular flange 154 to abut the end face of the spindle 12. FIG. 12 shows annular flange 154 abutted against the end face of spindle 12 before the collet 400 is actuated to clamp it. The flange 154 and spindle end face are abutted by Z-axis movement to provide a contact seal therebetween to prevent coolant and foreign matter from entering the spindle during grinding. As shown in FIG. 12, end face 400a of the collet is spaced axially from the spindle end face to allow sealing engagement between the flange 154 and spindle end face. Then, the collet 400 is actuated by the drawbar mechanism (pulled rightwardly of the spindle) to clamp and lock the end shank of the replacement quill in the illustrated position relative to the spindle. After the clamp pin 322 of the transfer member 198 is actuated by piston 324 to withdraw from the intermediate shank of the replacement quill to release same, the quill exchange arm 200 is pivoted counterclockwise 12° from horizontal to a clearance position $P_c$ and then the wheelhead 15 with replacement quill now chucked in the spindle is moved to the right in FIG. 9 by Z-axis slide 20. The exchange arm 200 can then be pivoted back to the rest position $P_R$ and clear the replacement quill now chucked in spindle 12. The quill exchange arm will remain at rest position $P_R$ with the quill just removed from spindle 12 releasable retained in station $S_1$ until the next worn wheel signal is generated. The quill exchange cycle described hereinabove will then be repeated.

As mentioned hereinabove, pivoting or rotation of the quill exchanger arm 200 is effected by the D.C. servomotor 270 through the gear reducer 264. As shown in FIG. 11, servomotor 270 is interfaced with control computer 62 by a drive means 430 similar to those described above for the slide servomotors. Movements of the Z-axis and X-axis slides 20,22 and quill exchange arm 200 by the respective servomotors are controlled and coordinated by control computer 62 without limit or other switches. Indexing of the tool magazine disc 126 by indexer 120 is also controlled by control computer 62 to position another replacement quill at position $P_1$. Suitable limit switches 300 (FIG. 11 are actuated by cams on indexer shaft 124 and the switch signals are fed to computer 62 which provides an appropriate control signal to the indexer.

Of course, those skilled in the art will appreciate that other sequences of pivoting quill exchange arm 200 may be employed. For example, the quill exchange arm 200 with both quill stations $S_1$, $S_2$ vacant at the rest position $P_R$ would pivot first counterclockwise to second quill exchange position $E_2$ to remove a quill with a worn wheel from the spindle in response to the worn wheel signal. The exchange arm could then be rotated clockwise to the first quill exchange position $E_1$ where the removed quill would be discharged from station $S_1$ and a replacement quill picked up at station $S_2$. The exchange arm could then be returned to the second quill exchange position $E_2$ to insert the replacement quill in the wheelhead spindle 12. The exchange arm with both quill station $S_1$, $S_2$ vacant could then be pivoted to the clearance position $P_c$ and then to the rest position $P_R$.

Those skilled in the art will also appreciate that the quill exchange arm 200 itself and/or the support frame 100 could be mounted on one or more slides to effect the necessary relative movement between the wheelhead spindle and quill transfer member at the second quill exchange position $E_2$ to effect removal of a quill from the spindle to station $S_1$ and insertion of a quill from station $S_2$.

And, although the invention has been described hereinabove with respect to an internal grinding machine, this was merely for illustrative purposes and the invention is applicable to other machine tool quills using tool quills other than grinding wheels. Further, although certain preferred features and embodiments of the invention have been described hereinabove and illustrated in the Figures, it is to be understood that modifications and changes may be made therein without departing from the spirit and scope of the invention as defined in the appended claims.

I claim:

1. A machine having a toolhead with a rotatable spindle releasably holding a tool quill and means for exchanging a replacement tool quill for a tool quill already on the toolhead spindle, said tool quill exchanging means comprising a tool quill storage means for storing a plurality of replacement tool quills, means for positioning a replacement tool quill of the storage means at a pick-up position, a tool quill discharge means having a tool quill pick-off cam means in spaced juxtaposition to the tool quill pick-up position and tool quill receiving means adjacent said pick-off cam means, a pivotal tool quill exchange arm pivotable to a first tool quill exchange position relative to the tool quill pick-up position and discharge means and a second tool quill exchange position relative to the toolhead and having a first tool quill station for releasably retaining a tool quill removed from the spindle and a second tool quill station for releasably retaining the replacement tool quill in spaced juxtaposition to the removed tool quill such that when said tool quill exchange arm is pivoted to the first tool quill exchange position the tool quill at said first tool quill station is removed therefrom by camming engagement with said tool quill pick-off means and is received in said tool quill receiving means and the replacement tool quill at said pick-up station is releasably retained by said second tool quill station, means for pivoting the tool quill exchange arm between the first and second tool quill exchange positions, and means for relatively moving the tool quill exchange arm and toolhead relative to the second tool quill exchange position to remove the tool quill from the spindle to said first tool quill station and to insert said replacement tool quill therein from said second tool quill station.

2. The machine of claim 1 wherein the tool quill storage means and positioning means comprise an indexable tool quill magazine.

3. The machine of claim 1 wherein said tool quill discharge means comprises said tool quill pick-off means and discharge chute means adjacent said pick-off means to receive a tool quill removed from said tool quill exchange arm.

4. The machine of claim 3 wherein the pick-off means comprises a cam plate for engaging the tool quill retained in the first station as the tool quill exchange arm is pivoted to the first tool exchange position to dislodge the tool quill therefrom.

5. The machine of claim 4 wherein the cam plate has an upwardly sloping surface for engaging the lower end of the tool quill to dislodge same.

6. The machine of claim 1 wherein the toolhead is carried on a compound slide assembly and the tool quill exchange arm is pivotally mounted on a support frame fixed in position on the machine.

7. A machine having a toolhead with a rotatable spindle releasably holding a tool quill and means for exchanging a replacement tool quill for another tool quill already on the toolhead spindle, said tool quill exchanging means comprising an indexable tool quill storage means for storing a plurality of replacement tool quills and positioning a replacement tool quill at a pick-up position, a tool quill discharge means having a tool quill pick-off cam means in spaced juxtaposition to the replacement tool quill pick-up position and a tool quill discharge chute means adjacent the pick-off cam means, a pivotal tool quill exchange arm pivotable to a first exchange position relative to the tool quill pick-up position and discharge means and a second exchange position relative to the toolhead and having a first tool quill station for releasably retaining a tool quill removed from the spindle and a second tool quill station for releasably retaining a replacement tool quill in spaced juxtaposition to the tool quill such that when said exchange arm is pivoted to the first exchange position the tool quill at said first tool quill station is removed therefrom by camming engagement between said tool quill pick-off cam means and an end of the tool quill and generally concurrently a replacement tool quill at said pick-up position is releasably retained by said second tool quill station, means for pivoting the tool quill exchange arm between the first and second tool quill exchange positions, and means for relatively moving the tool quill exchange arm and toolhead relative to the second tool quill exchange position to remove a tool quill from the spindle to said first tool quill station and to insert a replacement tool quill therein from said second tool quill station.

8. The machine of claim 7 wherein the pick-off cam means comprises a cam plate for engaging the tool quill retained in the first station as the tool quill exchange arm is pivoted to the first tool exchange position to dislodge the tool quill therefrom.

9. The machine of claim 8 wherein the cam plate has an upwardly sloping surface for engaging the lower end of the tool quill to dislodge same.

10. The machine of claim 7 wherein the toolhead is carried on a compound slide assembly and the tool quill exchange arm is pivotally mounted on a support frame fixed in position on the machine.

11. The machine of claim 7 wherein the tool quill exchange arm carries a tool quill transfer member having said first and second tool quill stations each quill station being in the form of a side pocket adapted to receive the tool quill and including means on the transfer member biased into each pocket to releasably retain a quill therein.

12. A grinding machine having wheelhead with a rotatable spindle releasably holding a grinding wheel quill and means for exchanging a new wheel quill for a worn wheel quill on the wheelhead spindle, said wheel quill exchanging means comprising an indexable wheel quill magazine for storing a plurality of new wheel quills and placing a new wheel quill at a pick-up position, a discharge means having a pick-off plate for a worn wheel quill in spaced juxtaposition to the new wheel quill pick-up position and a wheel quill discharge chute, a pivotal exchanger arm pivotable to a first exchange position relative to the magazine means and discharge means and a second exchange position relative to the wheelhead and having a first station for releasably retaining a worn wheel quill and a second station for releasably retaining a new wheel quill in spaced juxtaposition to said worn wheel quill such that when said exchange arm is pivoted to the first exchange position a worn wheel quill at said first station is engaged and removed therefrom by said pick-off plate and is received in said discharge chute and generally concurrently a new wheel quill at said pick-up position is releasably retained by said second station, means for pivoting the exchange arm to the first and second exchange positions, and means for relatively moving the exchange arm and wheelhead relative to the second exchange position to remove a worn wheel quill from the spindle to said first station and to insert a new wheel quill therein from said second station.

13. The machine of claim 12 wherein each wheel quill includes an annular flange abutted in sealing engagement against an end face of the spindle when a new wheel quill is inserted therein at the second exchange position to prevent foreign matter from entering the spindle during grinding.

* * * * *